(12) United States Patent
Parris (10) Patent No.: US 7,580,304 B2
(45) Date of Patent: Aug. 25, 2009

(54) MULTIPLE BUS CHARGE SHARING

(75) Inventor: Michael C. Parris, Colorado Springs, CO (US)

(73) Assignees: United Memories, Inc., Colorado Springs, CO (US); Sony Corporation, Tokyo (JP)

( * ) Notice: Subject to any disclaimer, the term of this patent is extended or adjusted under 35 U.S.C. 154(b) by 250 days.

(21) Appl. No.: 11/764,007

(22) Filed: Jun. 15, 2007

(65) Prior Publication Data

US 2008/0313379 A1 Dec. 18, 2008

(51) Int. Cl.
*G11C 7/00* (2006.01)

(52) U.S. Cl. .................. 365/203; 365/63; 365/149; 365/210.12

(58) Field of Classification Search .............. 365/203, 365/63, 149, 210.12
See application file for complete search history.

(56) References Cited

U.S. PATENT DOCUMENTS

| 4,941,128 | A * | 7/1990 | Wada et al. ............... 365/203 |
| 6,212,109 | B1 * | 4/2001 | Proebsting .............. 365/189.16 |
| 7,295,456 | B2 * | 11/2007 | Ogiwara et al. ............ 365/145 |
| 2008/0285327 | A1 * | 11/2008 | Ogiwara et al. ............ 365/145 |

OTHER PUBLICATIONS

Yamauchi, Hiroyuki, Akamatsu, Hironori, Fujita, Tsutomu, An Asymptotically Zero Power Charge-Recycling Bus Architecture for Battery-Operated Ultrahigh Data Rate ULSI's, IEEE Journal of Solid-State Circuits, vol. 30, No. 4, Apr. 1995, pp. 423-431.

Rajapandian, Saravanan, Shepard, Kenneth L., Hazucha, Peter, Karnik, Tanay, High-Voltage Power Delivery Through Charge Recycling, IEEE Journal of Solid-State Circuits, vol. 41, No. 6, Jun. 2006, pp. 1400-1410.

* cited by examiner

*Primary Examiner*—Tuan T. Nguyen
(74) *Attorney, Agent, or Firm*—Peter J. Meza; William J. Kubida; Hogan & Hartson LLP (57) ABSTRACT

A charge-sharing circuit includes a first input bus pair, a second input bus pair, and an output bus pair. A capacitor is coupled between a first internal node and a second internal node. A first circuit selectively couples the first internal node to the first input bus pair, the second input bus pair and the output bus pair. A second circuit selectively couples the second internal node to the first input bus pair, the second input bus pair and the output bus pair. A third circuit selectively couples the first input bus pair to a reference voltage. A fourth circuit selectively couples the second input bus pair to the reference voltage. The third circuit is activated when the first input bus pair is inactive and charge is shared between the second bus pair and the output bus pair. The fourth circuit is activated when the second input bus pair is inactive and charge is shared between first bus pair and the output bus pair.

25 Claims, 8 Drawing Sheets

MULTIPLE BUS CHARGE SHARING

CROSS REFERENCE TO RELATED PATENT APPLICATIONS

The present invention is related to co-pending applications, U.S. patent application Ser. No. 11/625,728 filed Jan. 22, 2007 for: "SWITCHED CAPACITOR CHARGE SHARING TECHNIQUE FOR INTEGRATED CIRCUIT DEVICES ENABLING SIGNAL GENERATION OF DISPARATE SELECTED SIGNAL VALUES" and U.S. patent application Ser. No. 11/759,823 entitled: "OPTIMIZED CHARGE SHARING FOR DATA BUS SKEW APPLICATIONS", the disclosures of which are herein specifically incorporated by this reference in its entirety.

FIELD OF THE INVENTION

The present invention is related to charge sharing circuits, and, more particularly, to a charge sharing circuit for an integrated circuit memory having the ability to hold bus voltage levels constant during long standby or inactive periods.

BACKGROUND OF THE INVENTION

Numerous charge sharing and charge recycling techniques are known including precharging and sharing charge between bit lines, charge recycling by switching between various power supply levels in charge pumped circuits, and various bus and circuit stacking techniques, as well as combinations of all of these techniques.

Charge sharing techniques have previously been employed in integrated circuit designs in order to save operating power. A typical circuit example is one utilized in conjunction with dynamic random access memory (DRAM) array bitlines which are precharged to a level of VCC/2 then driven to VCC (supply voltage level) or VSS (circuit ground) for the bit line (BL) and complementary bit line bar (/BL or BLB) depending on the state of the previously stored data.

Other contemporary circuit examples include the use of three groups of logic gates operating at three different voltage ranges. In operation, one group will transition from VCC/3 to VSS, the second group from 2VCC/3 to VCC/3 and the third group from VCC to 2VCC/3. In this manner, these three groups of logic gates can charge share with their adjacent voltage range group., but conventional designs are constrained to operate in this manner. Stated another way, with current circuit techniques the low level of signal or circuit block A is set equal to the high level of the adjacent signal or circuit block B.

Figure 1:
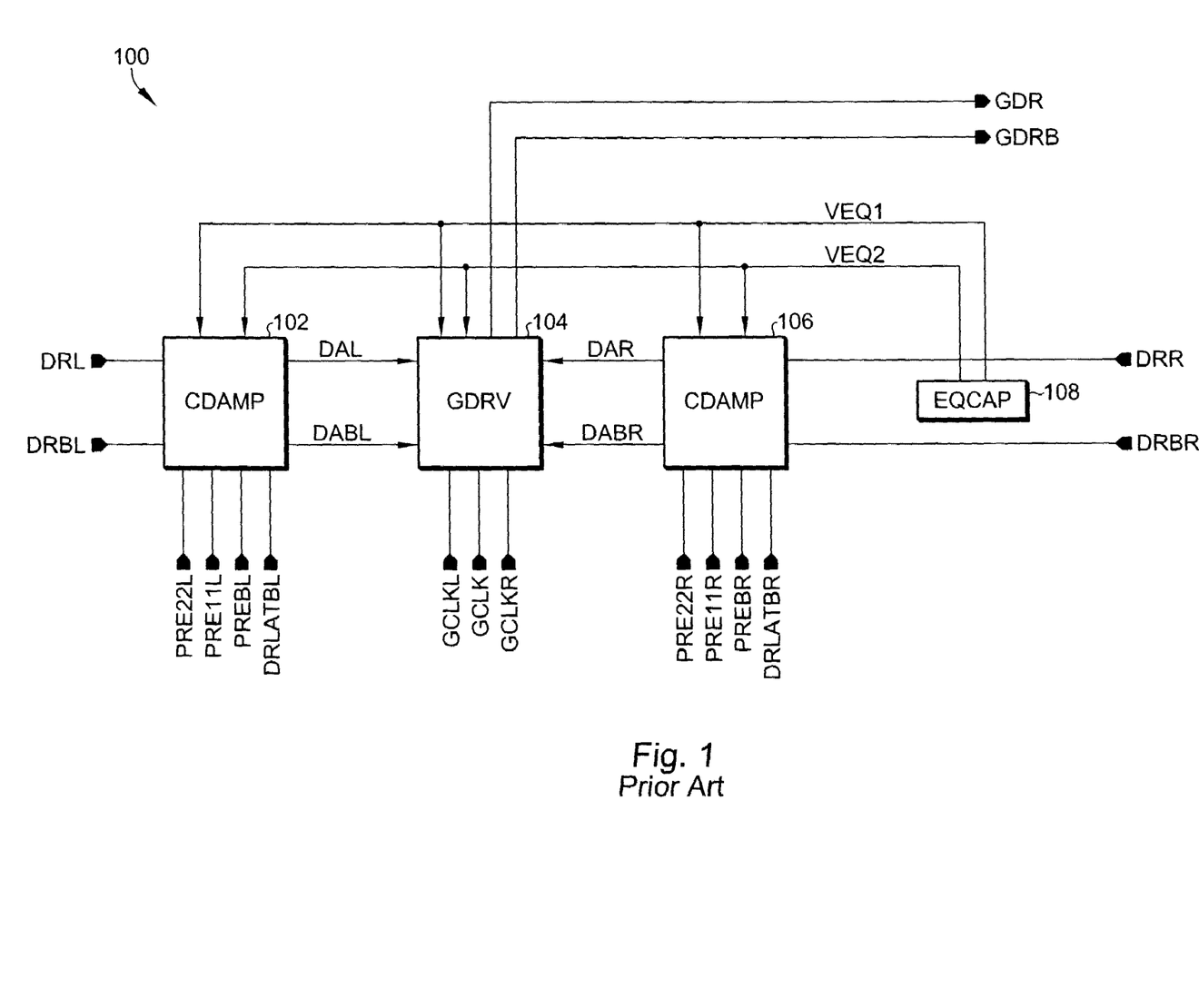
FIG. 1 is a block diagram of a prior art charge-sharing circuit for a DRAM implementation.

A typical prior art charge sharing circuit is shown in FIG. 1, which is a specific implementation for a DRAM circuit. At the left and right of the circuit are the local data read lines (DRL/DRBL, DRR/DRBR) and at the center of the circuit are the global data read lines (GDR/GDRB). Thus, the function of the circuit shown in FIG. 1 is to charge share between the local data read lines, and to provide a signal on the global data read lines for the purpose of reducing current consumption and power dissipation.

Charge sharing circuit 100 includes a CDAMP amplifier circuit 102 having an input coupled to a first bus pair DRL/DRBL. The output of CDAMP amplifier circuit 102 is coupled to a first driven bus pair DAL/DABL. Amplifier circuit 102 receives the VEQ1 and VEQ2 equalization voltages, and the PRE22L, PRE11L, PREBL, and DRLATBL control signals. Amplifier circuit 102 drives the DRL and DRBL signals onto the DAL and DABL lines under control of the various control signals. Similarly, charge-sharing circuit 100 includes a CDAMP amplifier circuit 106 having an input coupled to a second bus pair DRR/DRBR. The output of CDAMP amplifier circuit 106 is coupled to a second driven bus pair DAR/DABR. Amplifier circuit 106 receives the VEQ1 and VEQ2 equalization voltages, and the PRE22R, PRE11R, PREBR, and DRLATBR control signals. Amplifier circuit 106 drives the DRR and DRBR signals onto the DAR and DABR lines under control of the various control signals. The GDRV driver circuit 104 is coupled to the DAL/DABL and DAR/DABR bus pairs, and outputs the charge-shared signal on the GDR/GDRB bus pair. The VEQ1 and VEQ2 equalization voltages are provided by EQCAP circuit 108.

Prior art charge sharing circuits such as those shown in FIG. 1 do not have a means for holding input bus voltage levels during long standby or inactive periods. Holding the voltage levels constant during inactive times is important because of the increase in transistor leakage currents with today's advanced IC technologies. Prior art charge sharing circuits also do not have any means for multiplexing or selecting which electrical signals that will have their charge shared.

What is desired, therefore, is a charge sharing circuit that has the ability to hold the voltage level constant on input data busses during long inactive times and also has more flexible multiplexing and selecting charge sharing functions unavailable in the prior art.

SUMMARY OF THE INVENTION

According to the present invention, a charge-sharing circuit includes a first input bus pair, a second input bus pair, and an output bus pair. A capacitor is coupled between a first internal node and a second internal node. A first circuit selectively couples the first internal node to the first input bus pair, the second input bus pair and the output bus pair. A second circuit selectively couples the second internal node to the first input bus pair, the second input bus pair and the output bus pair. A third circuit selectively couples the first input bus pair to a reference voltage. A fourth circuit selectively couples the second input bus pair to the reference voltage. The third circuit is activated when the first input bus pair is inactive and charge is shared between the second bus pair and the output bus pair. The fourth circuit is activated when the second input bus pair is inactive and charge is shared between first bus pair and the output bus pair.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION

Figure 2:
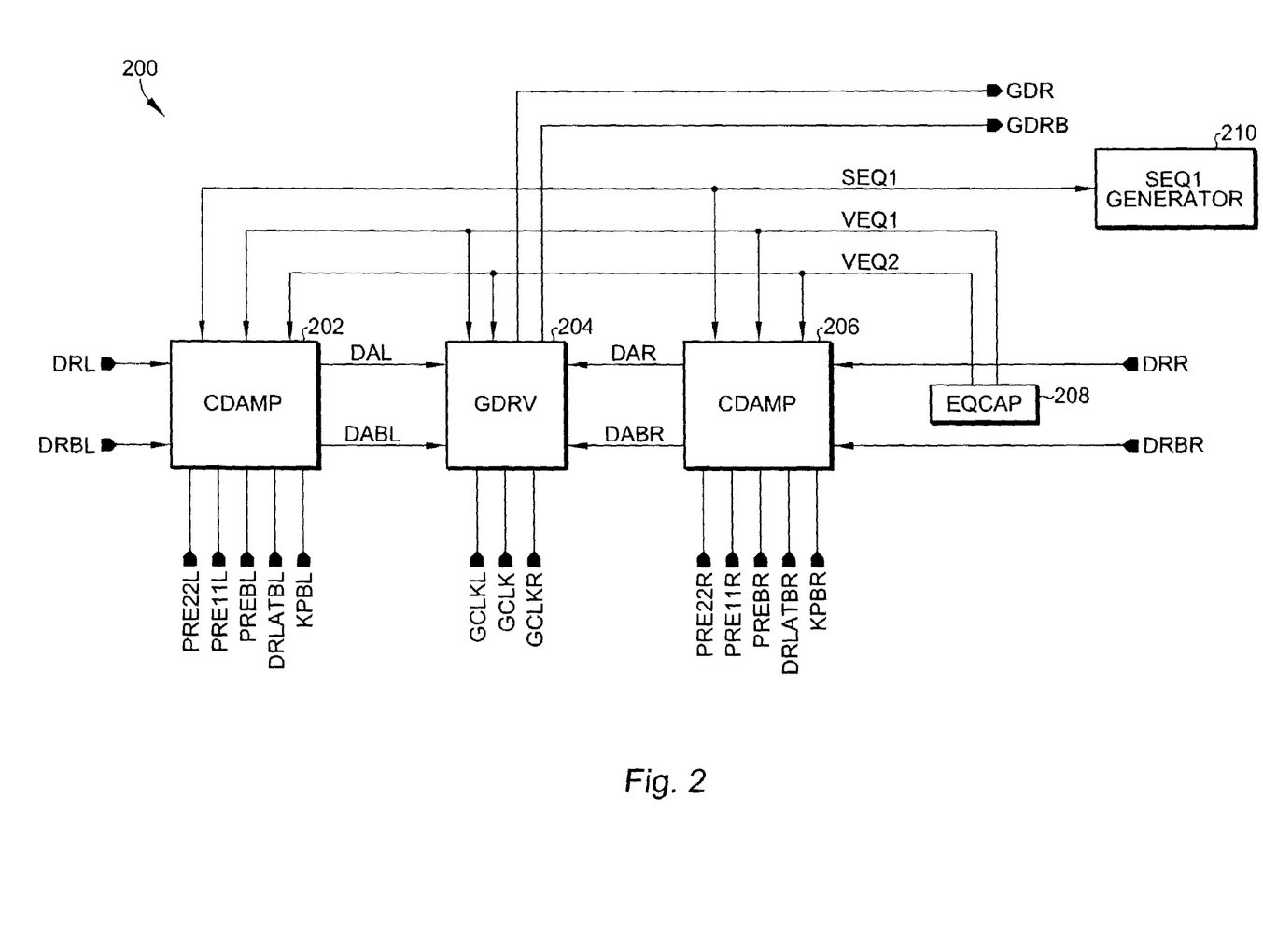
FIG. 2 is a block diagram of a charge-sharing circuit for a DRAM implementation according to the present invention having the ability to hold voltage levels on the input data busses constant during inactive times, and having improved multiplexing and selecting charge-sharing functionality.

Referring now to FIG. 2, a charge sharing circuit according to the present invention is shown, which is also suitable for use in DRAM circuits as is the circuit of FIG. 1. In addition to the charge sharing function, the circuit of FIG. 2 has the ability to hold voltage levels on the input data busses constant during inactive times, and having improved multiplexing and selecting charge-sharing functionality not possessed by the charge sharing circuit of FIG. 1.

Charge sharing circuit 200 includes CDAMP amplifier circuits 202 and 206 coupled to a GDRV circuit 204. EQCAP circuit 208 provides signals to amplifiers 202 and 206, as well as driver circuit 204. SEQ1 generator circuit 210 provides signals to amplifiers 202 and 206. Amplifier circuit 202 receives the DRL and DRBL signals, and provides the amplified DAL and DALB signals. The DRL and DRBL signals are the signals on a first set of busses that will be charged shared with signals on a second set of busses. Amplifier circuit 202 also receives the PRE22L, PRE11L, PREBL, DRLATBL, and KPBL control signals that are explained in further detail below. Amplifier circuit 202 also receives the SEQ1, VEQ1, and VEQ2 signals that are also explained in further detail below. Amplifier circuit 206 receives the DRR and DRBR signals, and provides the amplified DAR and DARB signals. The DRR and DRBR signals are the signals on a second set of busses that are charged shared with the signals on the first set of busses. Amplifier circuit 206 also receives the PRE22R, PRE11R, PREBR, DRLATBR, and KPBR control signals that are explained in further detail below. Amplifier circuit 206 also receives the SEQ1, VEQ1, and VEQ2 signals that are also explained in further detail below. Drive circuit 204 receives the DAL, DALB, DAR, and DARB and provides the charge-shared GDR and GDRB signals. Drive circuit 204 also receives the GCLKL, GCLK, and GCLKR clock signals, as well as the VEQ1 and VEQ2 signals.

Figure 3:
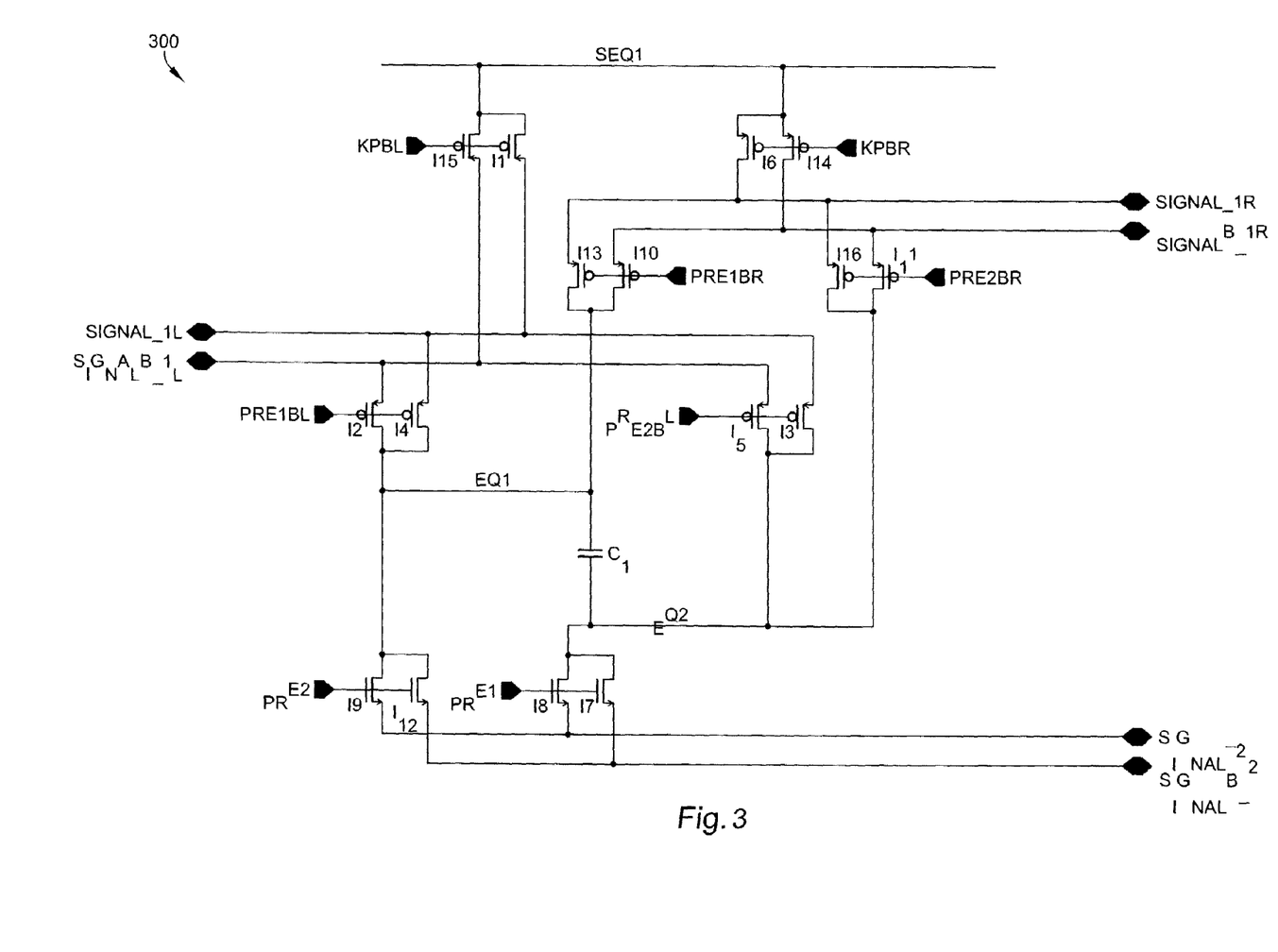
FIG. 3 is a transistor-level schematic diagram of a general application charge-sharing circuit according to the present invention, which is not specifically limited to DRAM applications.

A schematic level diagram of the charge sharing circuit of the present invention is shown in FIG. 3. The charge sharing circuit of the present invention has a similar improved functionality as described with respect to the circuit shown in FIG. 2, but is not specifically limited to a DRAM application. The circuit of FIG. 3 provides charge sharing between arbitrary two first sets of complementary signals, and an output signal comprising a second set of complementary signals.

In the schematic of charge sharing circuit 300 shown in FIG. 3, a first set of busses includes the signals SIGNAL_1L and SIGNALB_1L, a second set of busses includes the signals SIGNAL_1R and SIGNALB_1R, and an output set of busses for providing a charge-shared output signal including signals SIGNAL_2 and SIGNAL_2B. In FIG. 3, P-channel transistors I15 and I1 are coupled between the SEQ1 voltage and the first set of busses, and are controlled by the KPBL control signal. P-channel transistors I6 and I14 are coupled between the SEQ1 voltage and the second set of busses, and are controlled by the KPBR control signal. P-channel transistors I2 and I4 are coupled between the first set of busses and the EQ1 voltage, and are controlled by the PRE1BL control signal. P-channel transistors 113 and 110 are coupled between the second set of busses and the EQ1 voltage, and are controlled by the PRE1BR control signal. P-channel transistors I5 and I3 are coupled between the first set of busses and the EQ2 signal, and are controlled by the PRE2BL control signal. P-channel transistors I16 and I11 are coupled between the second set of busses and the EQ2 voltage, and are controlled by the PRE2BR control signal. N-channel transistors I9 and I12 are coupled between the EQ1 voltage and the output pair of busses, and are controlled by the PRE2 control signal. N-channel transistors I8 and I7 are coupled between the EQ2 voltage and the output pair of busses, and are controlled by the PRE1 control signal. Capacitor C1 is coupled between the EQ1 and EQ2 voltages to provide the charge sharing between the signals on the first and second sets of busses.

The operation of the charge-sharing circuit of the present invention is explained with reference to the schematic diagram of FIG. 3 and the waveform diagrams of FIG. 4. In the implementation of the present invention signal 1 left (SIGNAL_1L), signal 1 right (SIGNAL_1R) and signal 2 (SIGNAL_2) sets of lines are approximately equal in total capacitance and are differential signal pairs containing true and complement values. KPBL and KPBR are keeper bar (active low signals) left and right control signals. These signals go low when the opposite set of signal lines are active. PRE1BL and PRE2BL are precharge bar control signals 1 and 2 for the left set of signal lines. PRE1BR and PRE2BR are precharge bar control signals 1 and 2 for the second set of signal lines. PRE1 and PRE2 are precharge control signals for the second set of signal lines. Charge-sharing circuit 300, when operated as shown on the waveform diagram of FIG. 4, will charge share between the left or right first set of signals and the second set of signals through the switched capacitor C1. The waveform diagram of FIG. 4 shows active and precharge operation of these signal lines and precharge control lines.

During the active portion of this operation, drivers not shown in the schematic of FIG. 3 are turned on to force one of the SIGNAL_1 lines (either true or bar) to VCC and one of the SIGNAL_2 lines (either true or bar) to VSS. While any random selection of signal 1 left or right will work, the waveforms of FIG. 4 illustrate two active selections of the left signals followed by two active selections of the right signals. It is important to turn off the PRE1BR and PRE2BR lines when the left set of signal 1 lines are active in order to charge share similar amounts of charge. By doing this a similar capacitance value on the active signal 1 lines and signal 2 lines will result in similar signal levels on these lines. Since the non-used signal 1 lines can float for a long period of time during this period the KPB lines are used to hold them to the SEQ1 line. The SEQ1 line is a generated voltage level, set a level close to the inactive EQ1 level. An even number of active cycles are employed for circuit 300 so that signal 1 lines always end up being shorted to EQ1 and signal 2 lines end up being shorted to EQ2. This allows for a voltage generator to supply a DC voltage level during standby periods to hold EQ1 and EQ2 to levels similar to the charge shared generated levels. Since a common application for circuit 300 is with data paths on memory circuits and since data burst lengths of 2, 4, 8, 16 etc are common burst lengths, this restriction is not limiting. If a given application for the circuit requires a burst length of one or an odd number of active cycles, a dummy cycle can be added to keep the cycle count at an even number.

Figure 4:
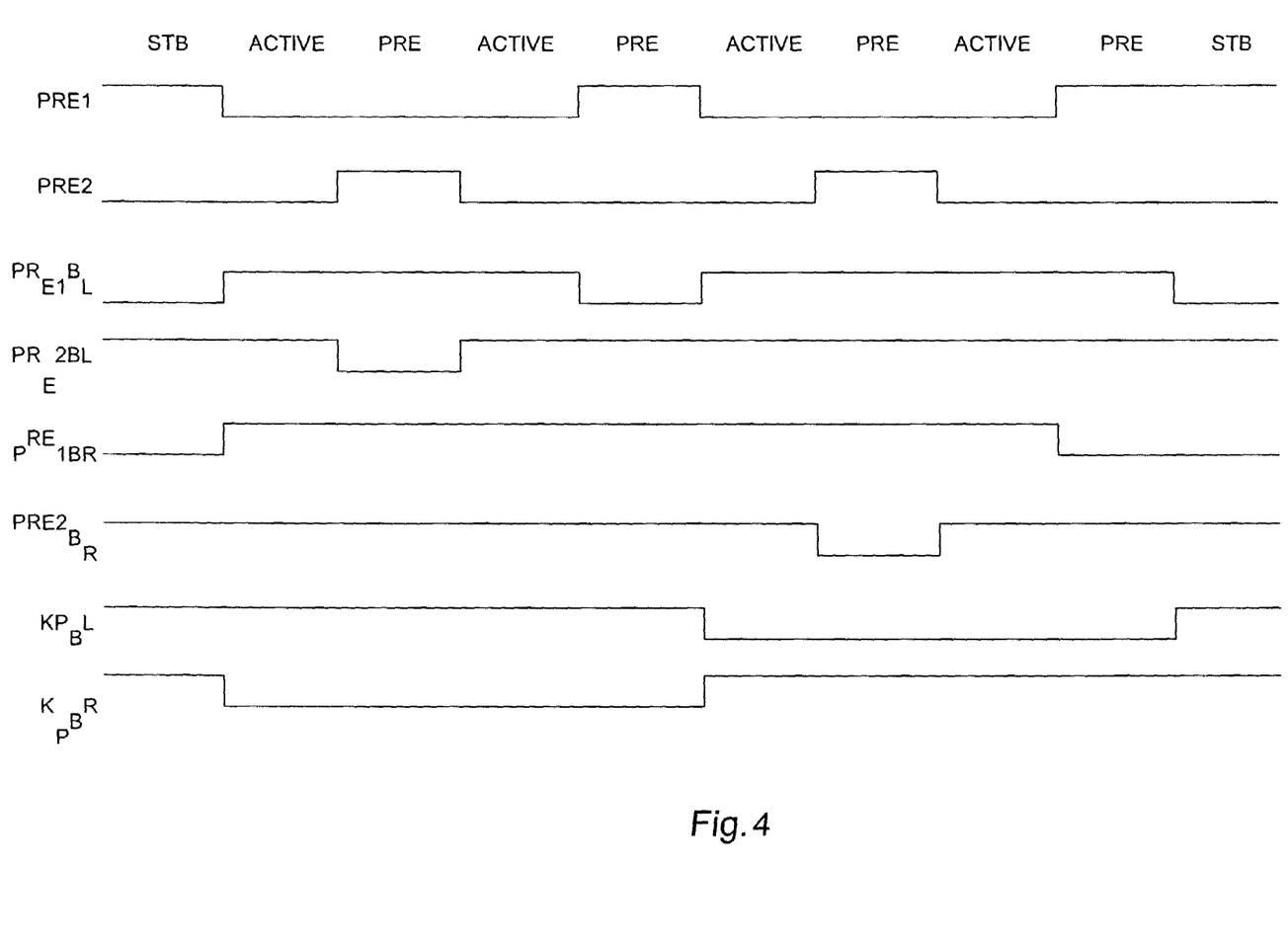
FIG. 4 is a timing diagram illustrating various signals associated with the charge-sharing circuit of FIG. 2.

Referring to FIG. 4, in a first standby mode the PRE1 signal is high and the PRE2 signal is low. Thus, SIGNAL_2 and SIGNALB_2 are coupled to the EQ2 node. The PRE1BL signal is low and the PRE2BL signal is high. Thus, SIGNAL_1L and SIGNALB_1L are coupled to the EQ1 node. The PRE1BR signal is low and the PRE2BR signal is high. Thus, SIGNAL_1R and SIGNALB_1R are coupled to the EQ1 node. The KPBL and KPBR signals are both high, and thus the SEQ1 voltage is not coupled to any of the signal 1 lines.

In a first active mode the PRE1 signal is low and the PRE2 signal is low. Thus, the voltage on the signal 2 lines is trapped at the EQ1 and EQ2 nodes. In the first active mode the PRE1BL and PRE2BL signals are both high. Thus, the voltage on the left signal 1 lines is trapped on the EQ1 node. The PRE1BR signal is high and the PRE2BR signal is high. Thus, the voltage of the right signal 1 lines is trapped on the EQ1 node. The KPBL signal is high and the KPBR signal is low. Thus, the right signal 1 lines are coupled to the SEQ1 voltage.

In a first precharge mode, the PRE1 signal is low and the PRE2 signal is high. Thus, the EQ1 node is coupled to the signal 2 lines. The PRE1BL signal is high and the PRE2BL signal is low. Thus the left signal 1 lines are coupled to the EQ2 node. The PRE1BR and PRE2BR signals are high. Thus the right signal 1 lines are inactive. The KPBL signal is high and the KPBR signal is low. Thus, the SEQ1 voltage is applied to the inactive right signal 1 lines.

In a second active mode, the control signals are set to the same voltages as in the first active mode.

In a second precharge mode, the PRE1 signal is high and the PRE2 signal is low. Thus, the EQ2 node is coupled to the signal 2 lines. The PRE1BL signal is low and the PRE2BL signal is high. Thus the left signal 1 lines are coupled to the EQ1 node. The PRE1BR and PRE2BR signals are high. Thus the right signal 1 lines are inactive. The KPBL signal is high and the KPBR signal is low. Thus, the SEQ1 voltage is applied to the inactive right signal 1 lines.

In a third active mode, the control signals are set to the same voltages as in the first active mode.

In a third precharge mode, the PRE1 signal is low and the PRE2 signal is high. Thus, the EQ1 node is coupled to the signal 2 lines. The PRE1BL signal is high and the PRE2BL signal is high. Thus the left signal 1 lines are inactive. The PRE1BR signal is high and the PRE2BR signal is low. Thus the right signal 1 lines are coupled to the EQ2 node. The KPBL signal is low and the KPBR signal is high. Thus, the SEQ1 voltage is applied to the inactive left signal 1 lines.

In a fourth active mode, the control signals are set to the same voltages as in the first active mode.

In a fourth precharge mode, the PRE1 signal is high and the PRE2 signal is low thus, the EQ2 node is coupled to the signal 2 lines. The PRE1BL signal is high and the RE2BL signal is high. Thus the left signal 1 lines are inactive. The PRE1BR signal is low and the PRE2BR signal is high. Thus the right signal 1 lines are coupled to the EQ1 node. The KPBL signal is low and the KPBR signal is high. Thus, the SEQ1 voltage is applied to the inactive left signal 1 lines.

In a second standby mode, the control signals are set to the same voltages as in the first standby mode.

Figure 5:
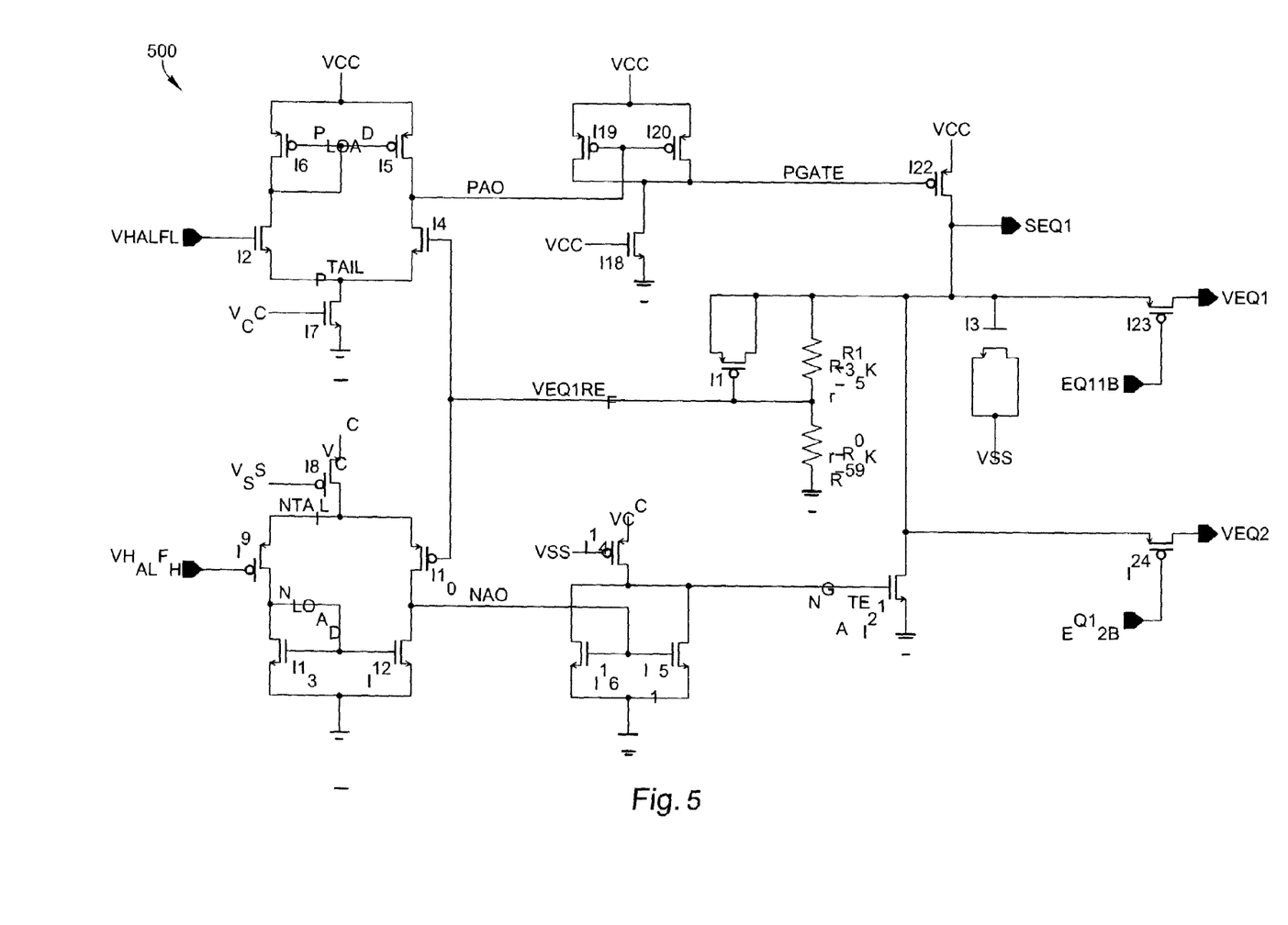
FIG. 5 is a schematic diagram of an equalization voltage generator circuit suitable for use with the charge-sharing circuit of FIG. 2.

A detailed circuit schematic is shown in FIG. 5, which is suitable for use as the equalization voltage generator 208 shown in FIG. 2. In voltage generator 500 of FIG. 5, a first amplifier (transistors I2, I4, I5, I6, I7) receives the input VHALFL and VEQ1REF voltages, and provides the PAO output voltage. The VHALFL and VHALFH voltages are DC voltage levels set to regulate the upper and lower limits of the SEQ1 signal. The VEQ1REF signal is a feedback signal based on the SEQ1 signal, ratioed through resistors RR1 and RR0 to the differential amplifiers. Similarly, a second amplifier (transistors I8, I9, I10, I12, I13) receives the input VHALFH and VEQ1REF voltages, and provides the NAO output voltage. The PAO voltage is used to generate the PGATE voltage through the circuit including P-channel transistors I19, I20, and N-channel transistor I18. Similarly, the NAO voltage is used to generate the NGATE through the circuit including N-channel transistors I16, I15, and P-channel transistor I14. P-channel transistor I22 and N-channel transistor I21 are coupled together to provide the SEQ1 reference voltage, which has a voltage of VCC/2. The VEQ1 voltage is provided by P-channel transistor I23, which is controlled by the EQ11B control signal. The VEQ2 voltage is provided by P-channel transistor I24, which is controlled by the EQ12B control signal. The voltage of the VEQ1 and VEQ2 voltages is also about VCC/2 when transistors I23 and I24 are on.

Figure 6:
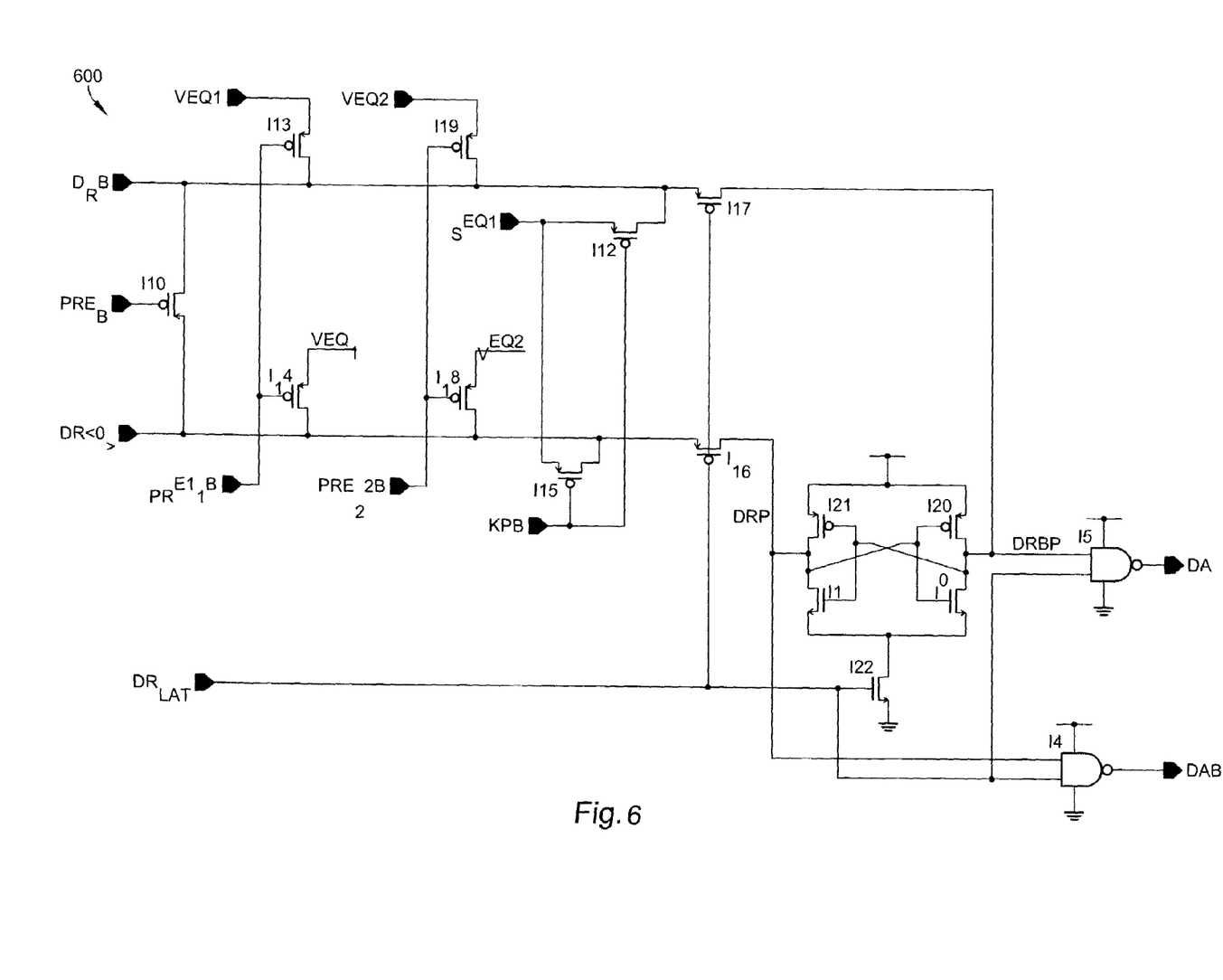
FIG. 6 is a center data amplifier suitable for use in the charge-sharing circuit of FIG. 2.

A detailed circuit schematic is shown in FIG. 6, which is suitable for use as the amplifier circuits 202 and 206 shown in FIG. 2. In FIG. 6, circuit 600 includes input signals DR and DRB, and output signals DA and DAB. A P-channel transistor I10 is coupled between the DR and DRB signals, controlled by the PREB control signal. The DRB signal is coupled to VEQ1 by P-channel transistor I13, controlled by the PRE11B control signal. Similarly, the DR signal is coupled to VEQ1 by P-channel transistor I14, controlled by the PRE11B control signal. The DRB signal is coupled to VEQ2 by P-channel transistor I19, controlled by the PRE22B control signal. Similarly, the DR signal is coupled to VEQ2 by P-channel transistor I18, controlled by the PRE22B control signal. The DR and DRB signals are coupled to the SEQ1 voltage though P-channel transistors I12 and I15, controlled by the KPB control signal. P-channel transistors I17 and I16 have current paths coupled between the DR and DRB signals and the DRP and DRBP signals, respectively. A latch including P-channel transistors I21 and I20, and N-channel transistors I1 and I0 is coupled to the DRP and DRBP nodes. The latch is enabled by N-channel transistor I22, which is controlled by the DRLAT enable signal. The output drive is provided by NAND gates I5 and I4 respectively coupled to the DA and DAB nodes.

Figure 7:
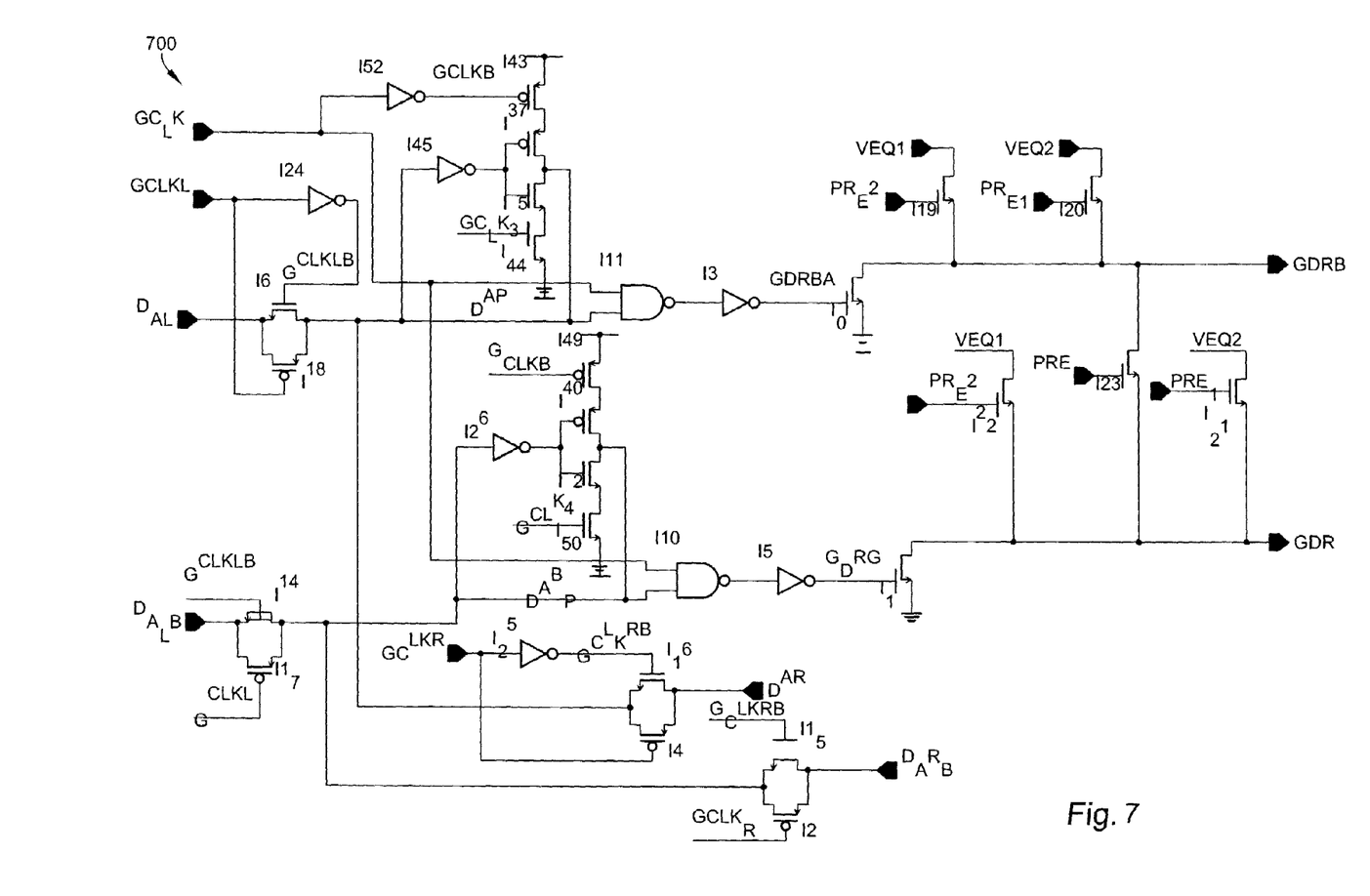
FIG. 7 is a schematic diagram of a GDRV drive circuit suitable for use in the charge-sharing circuit of FIG. 2.

A detailed schematic is shown in FIG. 7, which is appropriate for use in the GDRV driver block 204 shown in FIG. 2.

The GDR signal is driven by N-channel transistor I1. The VEQ1 signal can be placed on the GDR line by N-channel transistor I22 controlled by the PRE2 signal. The VEQ2 signal can be placed on the GDR line by N-channel transistor I21 controlled by the PRE1 signal. Transistor I1 is driven by the GDRG signal provided by input logic including NAND gate I10, which receives the GCLK and DABP signal, and by inverter I5.

The GDRB signal is driven by N-channel transistor I0. The VEQ1 signal can be placed on the GDRB line by N-channel transistor I19 controlled by the PRE2 signal. The VEQ2 signal can be placed on the GDRB line by N-channel transistor I20 controlled by the PRE1 signal. Transistor I0 is driven by the GDRBA signal provided by input logic including NAND gate I11, which receives the GCLK and DAP signal, and by inverter I3.

The GDRB and GDR signals can be shorted together through the action of transistor I23, which is controlled by the PRE signal.

The DAL signal is received by the passgate including transistors I6 and I18. Transistor I18 receives the GCLKL signal and transistor I6 receives the GCLKLB signal from inverter I24. The output of the passgate provides the DAP signal.

The DALB signal is received by the passgate including transistors I14 and I17. Transistor I17 receives the GCLKL signal and transistor I14 receives the GCLKLB signal from inverter I24. The output of the passgate provides the DABP signal.

Inverters I52, I45, and transistors I43/I37/I35/I44 as well as inverters I26 and transistors I49/I40/I42/I50 create GCLK enabled latches that prevent nodes DAP and DABP from floating when the pass gates I6/I18 and I14/I17 are turned off.

Figure 8:
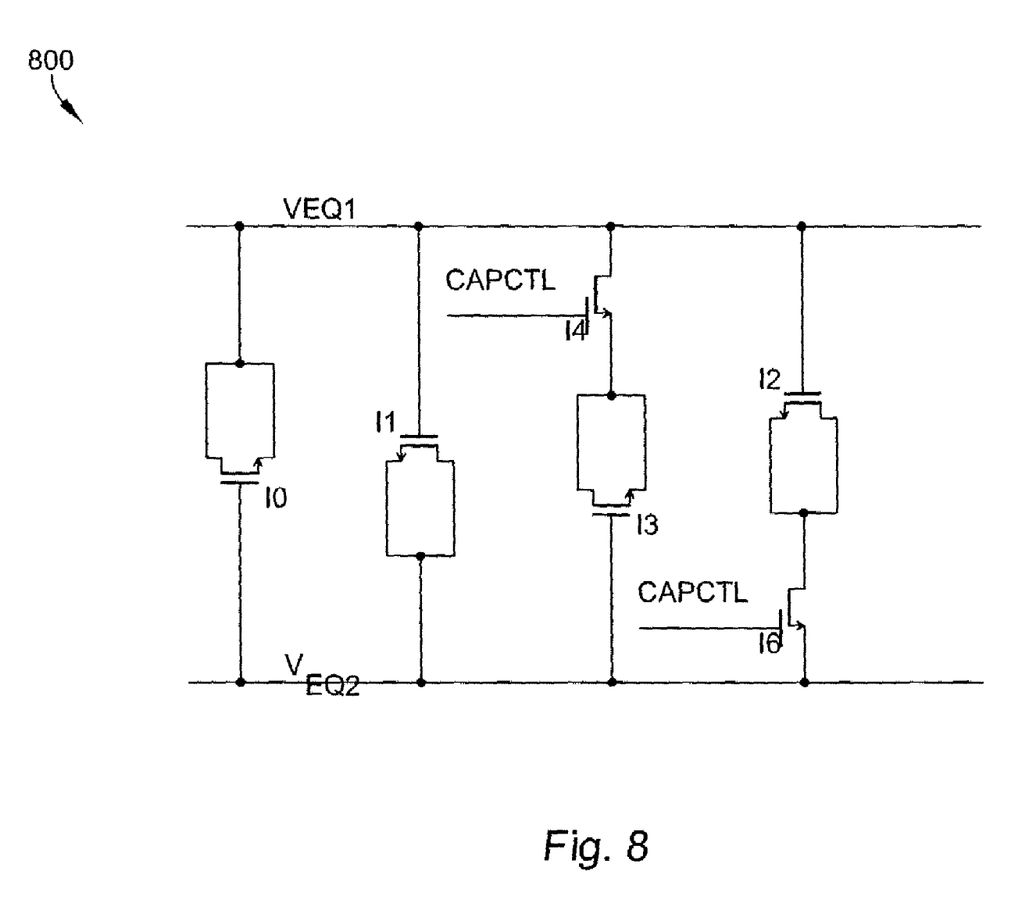
FIG. 8 is a schematic diagram of an EQCAP circuit suitable for use with the charge-sharing circuit of FIG. 2.

FIG. 8 is a more detailed schematic of a capacitor circuit 800 suitable for use as C1 in FIG. 3. Note that C1 is actually the parallel combination of four capacitor-coupled N-channel transistors I0, I1, I3 and I2. Capacitor-coupled transistors I3 and I2 are in series connection with N-channel transistors I4 and I6 controlled by the CAPCTL control signals for the purpose of increasing or decreasing the signal level on lines DR/DRB and GDR/GDRB.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

I claim:

1. A charge-sharing circuit comprising:
a first input bus pair;
a second input bus pair;
an output bus pair;
a capacitor coupled between a first internal node and a second internal node;
a first circuit for selectively coupling the first internal node to the first input bus pair, the second input bus pair and the output bus pair;
a second circuit for selectively coupling the second internal node to the first input bus pair, the second input bus pair and the output bus pair;
a third circuit for selectively coupling the first input bus pair to a reference voltage; and
a fourth circuit for selectively coupling the second input bus pair to the reference voltage.

2. The charge-sharing circuit of claim 1 wherein the third circuit is activated when the first input bus pair is inactive and charge is shared between the second bus pair and the output bus pair.

3. The charge-sharing circuit of claim 1 wherein the fourth circuit is activated when the second input bus pair is inactive and charge is shared between first bus pair and the output bus pair.

4. The charge-sharing circuit of claim 1 wherein the first circuit comprises a pair of selectively activated P-channel transistors for coupling the first internal node to the first input bus pair.

5. The charge-sharing circuit of claim 1 wherein the first circuit comprises a pair of selectively activated P-channel transistors for coupling the first internal node to the second input bus pair.

6. The charge-sharing circuit of claim 1 wherein the first circuit comprises a pair of selectively activated N-channel transistors for coupling the first internal node to the output bus pair.

7. The charge-sharing circuit of claim 1 wherein the second circuit comprises a pair of selectively activated P-channel transistors for coupling the second internal node to the first input bus pair.

8. The charge-sharing circuit of claim 1 wherein the second circuit comprises a pair of selectively activated P-channel transistors for coupling the second internal node to the second input bus pair.

9. The charge-sharing circuit of claim 1 wherein the second circuit comprises a pair of selectively activated N-channel transistors for coupling the second internal node to the output bus pair.

10. The charge-sharing circuit of claim 1 wherein the third circuit comprises a pair of selectively activated P-channel transistors.

11. The charge-sharing circuit of claim 1 wherein the fourth circuit comprises a pair of selectively activated P-channel transistors.

12. The charge-sharing circuit of claim 1 wherein the capacitor comprises a plurality of capacitor-connected transistors.

13. The charge-sharing circuit of claim 12 wherein at least one of the capacitor-connected transistors comprises a switchable capacitor-connected transistor.

14. A charge-sharing circuit comprising:
a first amplifier circuit coupled to a first input bus;
a second amplifier circuit coupled to a second input bus;
a driver circuit coupled to the first amplifier circuit, the second amplifier circuit, and an output bus;
a first circuit for coupling the first input bus to a reference voltage during a first inactive mode; and
a second circuit for coupling the second input bus to the reference voltage during a second inactive mode.

15. The charge sharing circuit of claim 14 wherein the first amplifier circuit comprises a selectively enabled latch circuit.

16. The charge sharing circuit of claim 14 wherein the second amplifier circuit comprises a selectively enabled latch circuit.

17. The charge sharing circuit of claim 14 wherein the drive circuit comprises a capacitor coupled to first and internal nodes for sharing charge between the first input bus and the output bus or the second input bus and the output bus.

18. The charge sharing circuit of claim 14 wherein the first circuit comprises a pair of selectively enabled P-channel transistors.

19. The charge sharing circuit of claim 14 wherein the second circuit comprises a pair of selectively enabled P-channel transistors.

20. The charge sharing circuit of claim 14 wherein the reference voltage comprises a voltage of about VCC/2.

21. The charge-sharing circuit of claim 17 wherein the capacitor comprises a plurality of capacitor-connected transistors.

22. The charge-sharing circuit of claim 21 wherein at least one of the capacitor-connected transistors comprises a switchable capacitor-connected transistor.

23. A charge sharing method comprising:
sharing charge between a first bus and an output bus and holding a second bus to a constant voltage in a first operating mode; and
sharing charge between the second bus and the output bus and holding the first bus to a constant voltage in a second operating mode.

24. The charge sharing method of claim 23 wherein the second bus is inactive during the first operating mode.

25. The charge sharing method of claim 23 wherein the first bus is inactive during the second operating mode.

* * * * *